US 6,616,157 B2

(12) United States Patent
Christophliemke et al.

(10) Patent No.: US 6,616,157 B2
(45) Date of Patent: Sep. 9, 2003

(54) TWIST-BEAM AXLE FOR MOTOR VEHICLES

(75) Inventors: Wigbert Christophliemke, Schloss Holte-Stukenbrock (DE); Wolfgang Streubel, Detmold (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 10/058,648

(22) Filed: Jan. 28, 2002

(65) Prior Publication Data

US 2002/0105159 A1 Aug. 8, 2002

(30) Foreign Application Priority Data

Jan. 31, 2001 (DE) ..................... 201 01 602 U

(51) Int. Cl.7 ............. B60G 3/14; B60G 21/05
(52) U.S. Cl. ......... 280/124.106; 280/124.116; 280/124.166; 301/124.1; 267/273
(58) Field of Search ............ 280/124.106, 124.107, 280/124.11, 124.116, 124.128, 124.166; 301/124.1, 127; 267/273, 188

(56) References Cited

U.S. PATENT DOCUMENTS 4,790,974 A * 12/1988 Perkins et al. ........ 280/124.116

FOREIGN PATENT DOCUMENTS

| DE | 4330192 A1 | * 3/1994 | ............. B60G/3/14 |
| DE | 44 16 725 A1 | 11/1995 | |
| EP | 960752 A2 | * 12/1999 | ............. B60G/21/05 |
| EP | 1036679 A2 | * 9/2000 | ............. B60G/21/05 |
| FR | 2654987 A1 | 5/1991 | |

* cited by examiner

Primary Examiner—Peter C. English
(74) Attorney, Agent, or Firm—Henry M. Feiereisen

(57) ABSTRACT

A twist-beam axle for motor vehicles, includes two longitudinal control arms, and a transverse strut interconnecting the longitudinal control arms and having over a major portion of its length a doubled-walled cross section of V-shaped or U-shaped configuration, thereby defining an inner profile and an outer profile. The inner and outer profiles support one another at least over predetermined portions to define a contact zone therebetween for receiving a friction-reducing additive.

26 Claims, 2 Drawing Sheets

TWIST-BEAM AXLE FOR MOTOR VEHICLES

CROSS-REFERENCES TO RELATED APPLICATIONS

This application claims the priority of German Patent Application, Serial No. 201 01 602.8, filed Jan. 31, 2001.

BACKGROUND OF THE INVENTION

The present invention relates, in general, to a twist-beam axle, and more particularly to a twist-beam rear axle of a type having two longitudinal control arms interconnected by a double-walled transverse strut of V or U shape.

Twist-beam axles combine the advantages of a simple structure with slight spatial demands and good kinematic properties. The transverse strut for interconnecting the longitudinal control arms acts as torsion bar so as to realize a characteristic of a longitudinal control arm upon simultaneous compression and a characteristic of a semi-trailing arm upon reciprocal compression.

Various proposals have been made to so configure the transverse strut of a twist-beam axle as to be rigid on one side and to provide sufficiently low degree of torsional stiffness on the other side. German Pat. No. DE 44 16 725 A1 discloses a twist-beam axle with two rigid longitudinal control arms, which are elastically linked to the superstructure and carry two wheels. The longitudinal control arms are welded to one another by a transverse strut, which is rigid, but of low torsional stiffness. The transverse strut is made over its entire length of a tubular profile which at both ends has a cross section of high torsional stiffness and in midsection a U, V, L, X or similar cross section of low torsional stiffness with at least a double-walled profile leg.

Another conventional twist-beam axle includes a transverse strut of V-shaped cross section. The transverse strut is welded by U-shaped transition pieces with the longitudinal control arm.

To date, twist-beam axles of conventional configuration use in a wide variety of application tubular transverse struts which have at least over a major portion of their length a V-shaped or U-shaped double-walled cross section. As a result, the need for stabilizers is eliminated. Moreover, the relative disposition of the profile relative to the longitudinal control arms allows adjustment of the running behavior in dependence on the respective chassis and thus positive modification to suit the respective type of motor vehicle. At the same time, the tubular configuration has weight advantages compared to conventional torsional profiles made of flat material.

Although continuous advances of conventional twist-beam axles have resulted in increased performance and decreased weight, there is still a need for better performance and increased service life, while yet realizing an economic configuration of the twist-beam axle.

It would therefore be desirable and advantageous to provide an improved twist-beam axle for motor vehicles, which obviates prior art shortcomings and which improves the running behavior while having a greater service life.

SUMMARY OF THE INVENTION

According to one aspect of the present invention, a twist-beam axle for motor vehicles, includes two longitudinal control arms, and a transverse strut interconnecting the longitudinal control arms and defined by a length, wherein the transverse strut has over a major portion of the length a doubled-walled cross section of one of V-shaped configuration and U-shaped configuration, thereby defining an inner profile and an outer profile, wherein the inner and outer profiles support one another at least over predetermined portions to define a contact zone therebetween for receiving a friction-reducing additive.

As the outer and inner profiles support one another, the dynamic stress behavior of the twist-beam axle is improved, thereby enhancing the running behavior of the vehicle. Torsional forces and bending forces, encountered during operation, are transmitted from the longitudinal control arms into the transverse strut for compensation. The mutual support of both profiles acts hereby in a positive way. When both wheels are compressed, a relative movement between the walls of the outer profiles and inner profiles is effected. This relative movement results in a friction between both profiles, which is lowered by the friction-reducing additive in the contact zone of both profiles. As a consequence, the twist-beam axle according to the present invention exhibits a superior static and dynamic load behavior and has a very long service life.

In addition to the friction-reducing effect, the additive provides also a corrosion protection. Suitably, the additive should have a composition that maintains effectiveness over a temperature range from $-60°$ C. to $+80°$ C. An example of a proper material for an additive includes an additive on ceramic bases. Useful, for example, may be an additive in the form of a metal oxide lubricant, which, after application, forms a ceramic protective film by which a reliable lubrication is ensured. Other useful examples for additives include temperature-resistant additives, which are stable at temperatures of up to more than $1,000°$ C. In this way, the twist-beam axle according to the invention is capable to withstand all temperatures influences, even those encountered during manufacturing processes, such as, e.g., welding works, paint works and the like.

Basically, it is conceivable to coat only the inside surfaces of the transverse strut in the contact zones with additive. Of course, it is also possible to coat the entire inside surface. Suitably, the additive is liquid during application. However, the additive is so constituted that, already after a short time, it becomes pasty in order to avoid an uncontrolled leaking. In this way, the additive can be rationally applied during a normal manufacturing process. After application of the additive, the tube, as initial material, is shaped without removal of material into the transverse strut. As an alternative, the transverse strut may also be made in shell construction, for example, from two pressed shells, which form the outer and inner profiles and are welded together. Of course, the profile of the transverse strut may be shaped initially, and subsequently, the friction-reducing additive may be applied. As the additive is liquid, application of the additive results in a penetration into the voids and in a wetting of the surface as a consequence of the capillary effect.

According to another feature of the present invention, the additive may be a mixture, in particular an emulsion-like or oil-containing mixture, and may contain hard mineral constituents, for example, ceramic pigments or corundum, silicon carbide, or aluminum oxide. Currently preferred is a mixture of oils or grease, ceramic pigments, antiseize agents and volatile ingredients. The volatile ingredients evaporate after application so that the initially flowing mixture is transformed into a pasty mass. When subjected to external pressure, the hard constituents are able to penetrate the surface of the transverse strut in the contact zone. In the contact zone, the hard constituents form an area of very low friction value in conjunction with the antiseize agents. The thus-modified surfaces do not experience seizing.

A twist-beam axle according to the present invention may be made of steel as well as of light metal or light metal alloy. As a consequence of the V-shaped or U-shaped cross section of the twist-beam axle according to the invention, the torsional properties of the transverse strut are improved while yet reducing the weight. The running behavior, in particular the camber change and bump toe-in during alternating compression and/or turn-in ability of the twist-beam axle are improved, when negotiating curves. Suitably, the transverse strut is made of a tubular profile, which at both ends has a cross section of high torsional stiffness and in mid-section a U-shaped or V-shaped double-walled cross section of low torsional stiffness. This configuration of the transverse strut results in a better distribution of the forces. Encountered bending and torsion forces are sufficiently absorbed by the longitudinal control arms.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
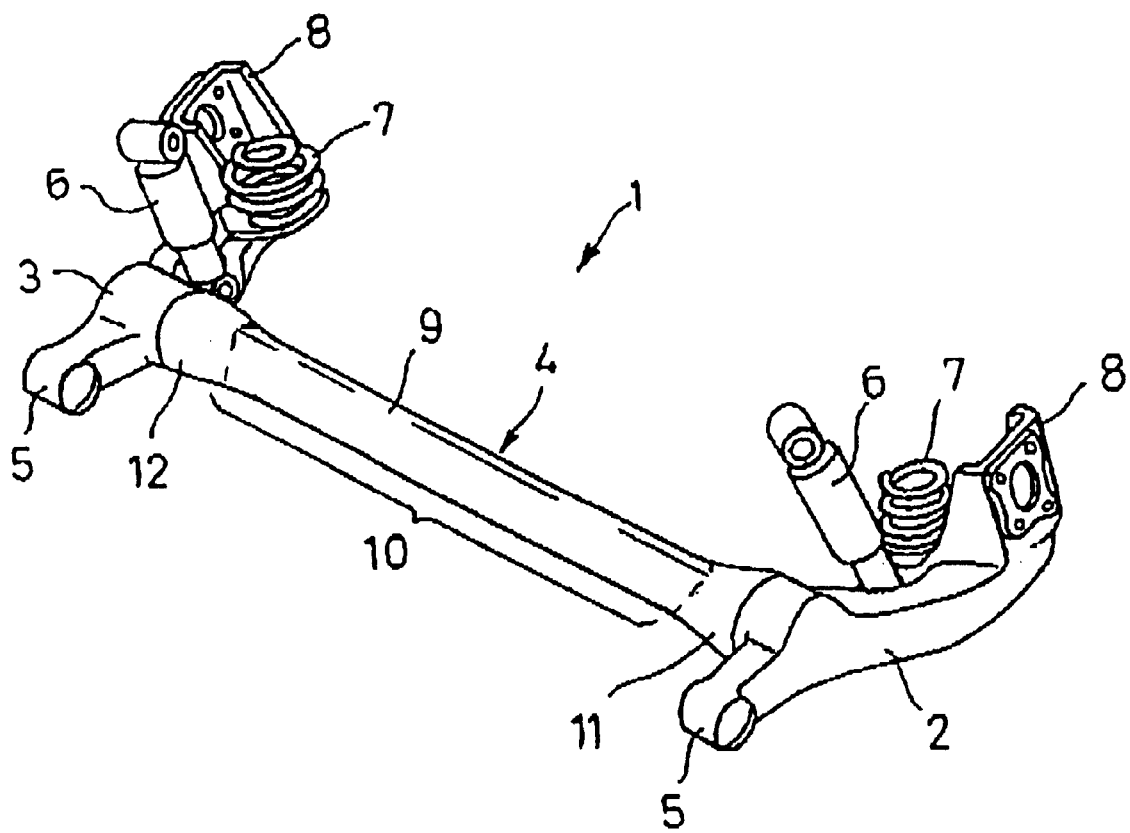
FIG. 1 is a perspective illustration of a twist-beam axle embodying the present invention.

Turning now to the drawing, and in particular to FIG. 1, there is shown a perspective illustration of a twist-beam axle, generally designated by reference numeral 1 and embodying the present invention. The twist-beam axle 1 includes two longitudinal control arms 2, 3 and a transverse strut 4 interconnecting the longitudinal control arms 2, 3. The longitudinal control arms 2, 3 are designed as tubular members. Each of the longitudinal control arms 2, 3 is provided at its forward end with a mounting eye 5 for elastic articulation of the vehicle body, not shown. Shock absorbers 6 and springs 7 are disposed between the longitudinal control arms 2, 3 and the vehicle body. At their rear end, the longitudinal control arms 2, 3 are provided with receptacles 8 for connection of a, not shown, wheel carrier for support of a wheel.

The transverse strut 4 has a tubular profile 9, with a mid-section 10 (torsional zone) having a cross section of low torsional stiffness, and with axial ends 11, 12 having a cross section of high torsional stiffness. The transitions between the mid-section 10 to the axial ends 11, 12, i.e. the transitions from the cross section of low torsional stiffness to the cross section of high torsional stiffness is gradual.

Figure 2:
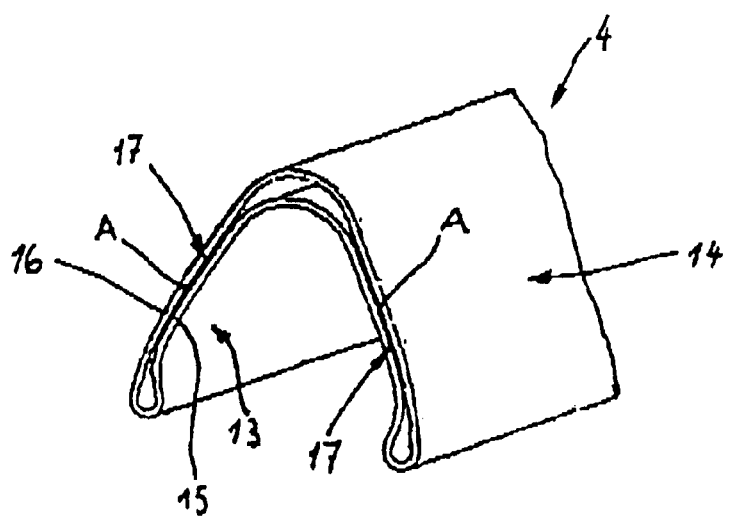
FIG. 2 is a vertical section through a transverse strut of the twist-beam axle.

As best seen in FIG. 2, the transverse strut 4 has a mid-section 10 which covers a major portion of its length and has a V-shaped or U-shaped double-walled cross section with an inner profile 13 and an outer profile 14 which contact one another along their legs 15, 16 at least over certain areas to thereby support one another and to define a contact zone 17. Applied at least in the contact zone 17 between the outer profile 14 and the inner profile 13 is a friction-reducing additive A. Currently preferred is an additive A in the form of a mixture of mineral oils, synthetic oils, ceramic pigments, benzins, and antiseize agents.

The additive A is added as liquid into the tubular profile 9 during manufacture of the transverse strut 4. Subsequently, the tubular profile 9 is shaped without material removal into the transverse strut 4 to receive the V-shaped or U-shaped cross section. During its application, the additive A is liquid, so that the inner surface of the tubular profile 9 is wetted in an optimum manner. After a short period, the additive A changes its consistency and becomes pasty, thereby preventing a leakage of additive A during further processing.

The additive A contains hard constituents, for example, mineral constituents such as ceramic pigments or corundum, silicon carbide, or aluminum oxide. The hard constituents penetrate the surface of the transverse strut 4 in the contact zone 17, when subjected to external pressure, to thereby form an area of very low friction value.

Figure 3:
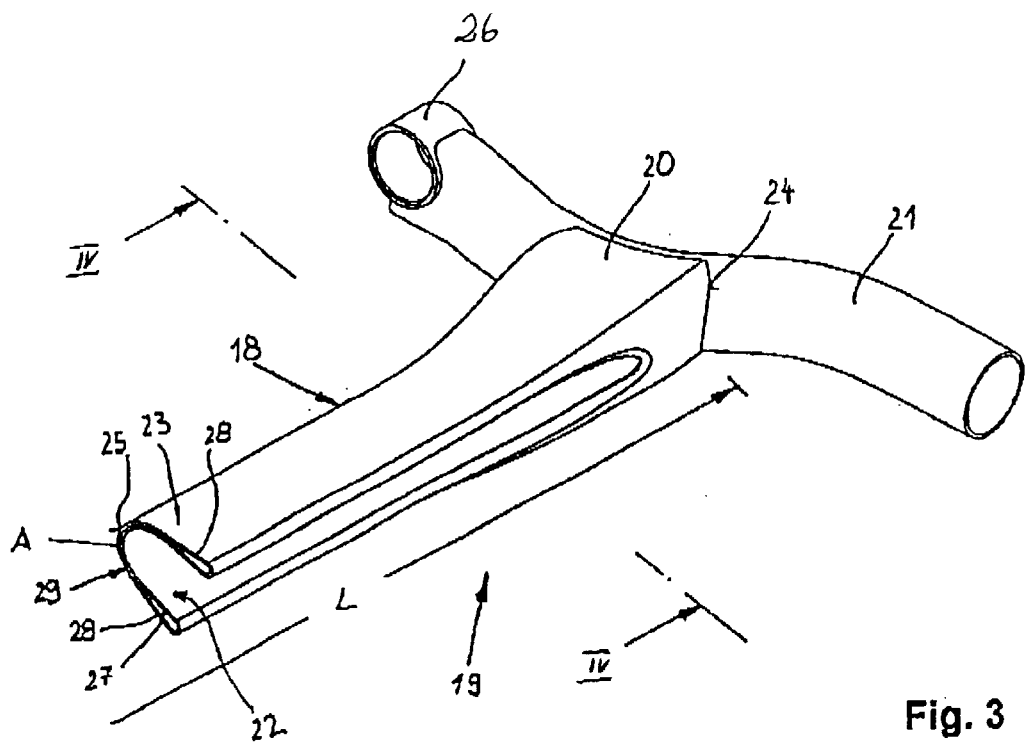
FIG. 3 is a perspective illustration of another embodiment of a twist-beam axle according to the present invention for a motor vehicle, illustrating the joining zone of a transverse strut to a control arm.

Referring now to FIG. 3, there is shown a perspective illustration of another embodiment of a twist-beam axle according to the present invention for a motor vehicle, generally designated by reference numeral 19. The twist-beam axle 19 has a transverse strut 18, which is configured in symmetry relative to a vertical mid-plane. The transverse strut 18 is welded on its ends 20 to tubular longitudinal control arms 21. Over a major portion of its length L, the transverse strut 18 has a V-shaped double-walled cross section with an inner profile 22 and an outer profile 23. The transverse strut 4 is made through shaping a tube of round cross section without material removal. The ends 20 of the transverse strut 4 are shaped without material removal into a box-shaped configuration and have end faces 24 which are connected to the longitudinal control arms 21 by circumferential weld seams. The ends 20 have an enlarged cross section and extend beyond the apex 25 of the transverse strut 18 in the direction of receptacles 26, provided at the ends of the longitudinal control arms 21, for rubber bearings, not shown.

Figure 4:
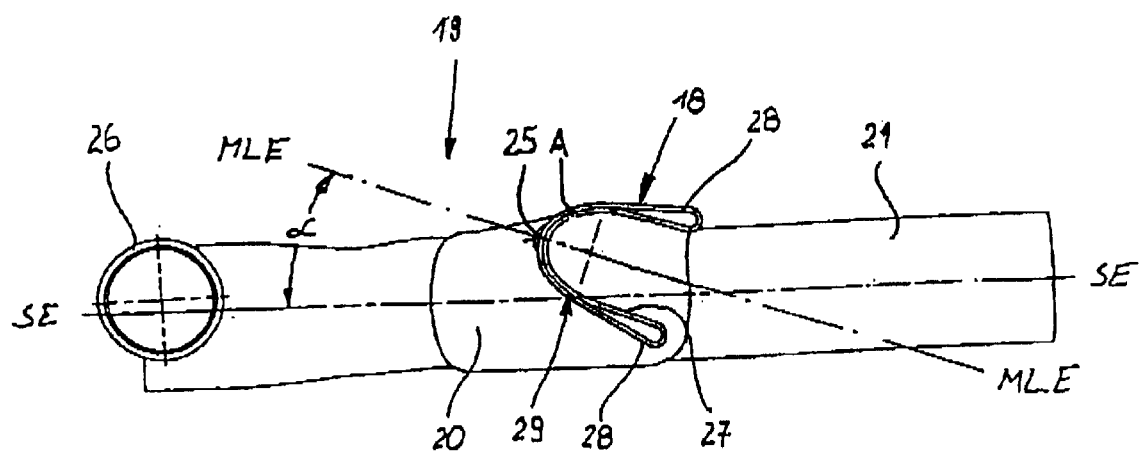
FIG. 4 is a vertical section of the transverse strut, taken along the line IV—IV in FIG. 3.

As best shown in FIG. 4, which is a vertical section of the transverse strut 18, taken along the line IV—IV in FIG. 3, a central longitudinal plane MLE, which runs through the apex 25 and in mid-section between the legs 27, 28 of inner and outer profiles 22, 23, extends at an angle α with respect to a symmetry plane SE, which extends through the longitudinal axes of the longitudinal control arms 21. Depending on the desired running behavior of the motor vehicle as far as roll stiffness, wheel alignment and camber adjustment at the wheel flange are concerned, the angle α may range between 20° and 60°, preferably 30° to 50°.

In the area of the apex 25 and the continuing legs 27, 28, the inner profile 22 and the outer profile 23 support one another. Additive A is applied at least in the contact zone 29 between the inner and outer profiles 22, 23 to decrease friction in the contact zone 29, thereby preventing seizing in the thus-configured surfaces.

While the invention has been illustrated and described as embodied in a twist-beam axle for motor vehicles, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A twist-beam axle for motor vehicles, comprising two longitudinal control arms, and a transverse strut interconnecting the longitudinal control arms and defined by a length, wherein the transverse strut has over a major portion of the length a doubled-walled cross section of one of V-shaped configuration and U-shaped configuration, thereby defining an inner profile and an outer profile, wherein the inner and outer profiles support one another at least over predetermined portions to define a contact zone therebetween that receives a friction-reducing additive.

2. The twist-beam axle of claim 1, wherein the additive has a ceramic basis.

3. The twist-beam axle of claim 1, wherein the additive is a metal oxide lubricant.

4. The twist-beam axle of claim 1, wherein the additive is temperature-resistant.

5. The twist-beam axle of claim 1, wherein the additive is a material containing hard constituents configured to press into contacting surfaces of the contact zone, when subjected to a pressure.

6. The twist-beam axle of claim 5, wherein the hard constituents include mineral constituents.

7. The twist-beam axle of claim 6, wherein the mineral constituents include a material selected from the group consisting of ceramic pigment, corundum, silicon carbide, and aluminum oxide.

8. The twist-beam axle of claim 1, wherein the additive is a mixture selected from the group consisting of an emulsion and an oil-containing mixture.

9. The twist-beam axle of claim 1, wherein the additive is a mixture containing oil or grease, ceramic pigments, antiseize agents and volatile ingredients.

10. The twist-beam axle of claim 1, wherein the additive is a mixture containing materials selected from the group consisting of mineral oil, synthetic oil, ceramic pigment, benzin, and antiseize agent.

11. The twist-beam axle of claim 1, wherein the transverse strut defines a central longitudinal plane which extends at an angle with respect to a symmetry plane through the longitudinal control arms.

12. The twist-beam axle of claim 11, wherein the angle ranges between 20° and 60°.

13. The twist-beam axle of claim 11, wherein the angle ranges between 30° to 50°.

14. A transverse strut for use in a motor vehicle axle, comprising a body portion defined by a length, wherein the body portion has over a major portion of the length a doubled-walled cross section of one of V-shaped configuration and U-shaped configuration, thereby defining an inner profile and an outer profile, wherein the inner and outer profiles support one another at least over predetermined portions to define a contact zone therebetween that receives a friction-reducing additive.

15. The transverse strut of claim 14, wherein the additive has a ceramic basis.

16. The transverse strut of claim 14, wherein the additive is a metal oxide lubricant.

17. The transverse strut of claim 14, wherein the additive is temperature-resistant.

18. The transverse strut of claim 14, wherein the additive is a material containing hard constituents configured to press into contacting surfaces of the contact zone, when subjected to a pressure.

19. The transverse strut of claim 18, wherein the hard constituents include mineral constituents.

20. The transverse strut of claim 19, wherein the mineral constituents include a material selected from the group consisting of ceramic pigment, corundum, silicon carbide, and aluminum oxide.

21. The transverse strut of claim 14, wherein the additive is a mixture selected from the group consisting of an emulsion and an oil-containing mixture.

22. The transverse strut of claim 14, wherein the additive is a mixture containing oil or grease, ceramic pigments, antiseize agents and volatile ingredients.

23. The transverse strut of claim 14, wherein the additive is a mixture containing materials selected from the group consisting of mineral oil, synthetic oil, ceramic pigment, benzin, and antiseize agent.

24. The transverse strut of claim 14, wherein the body portion defines a central longitudinal plane which extends at an angle with respect to a symmetry plane of the axle.

25. The transverse strut of claim 24, wherein the angle ranges between 20° and 60°.

26. The transverse strut of claim 24, wherein the angle ranges between 30° to 50°.

* * * * *